(12) United States Patent
Mizunuma et al.

(10) Patent No.: US 7,754,116 B2
(45) Date of Patent: Jul. 13, 2010

(54) SHEET FORMING APPARATUS AND ROLLER GAP CONTROL METHOD

(75) Inventors: Koji Mizunuma, Sunto-gun (JP); Tomonori Yamaguchi, Numazu (JP); Takehiro Yamamoto, Shizuoka (JP); Tomokazu Abe, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 748 days.

(21) Appl. No.: 11/419,655

(22) Filed: May 22, 2006

(65) Prior Publication Data

US 2006/0260484 A1 Nov. 23, 2006

(30) Foreign Application Priority Data

May 23, 2005 (JP) ............................. 2005-149927
Aug. 24, 2005 (JP) ............................. 2005-243246

(51) Int. Cl.
*B29C 43/24* (2006.01)
*B29C 43/58* (2006.01)

(52) U.S. Cl. .................. 264/40.5; 264/173.1; 264/175; 425/141; 425/149; 425/150; 425/367

(58) Field of Classification Search ................ 264/175, 264/40.5, 40.7, 173.1; 425/141, 149, 150, 425/365, 367
See application file for complete search history.

(56) References Cited

U.S. PATENT DOCUMENTS

| | | | |
|---|---|---|---|
| 3,531,827 A | 10/1970 | Dragonette | |
| 3,599,288 A * | 8/1971 | Eakman | ...................... 425/141 |
| 4,214,857 A * | 7/1980 | Woeckener et al. | ......... 425/141 |
| 4,319,947 A * | 3/1982 | Tokuno | ...................... 425/141 |
| 4,810,179 A | 3/1989 | Cavanagh | |
| 5,158,724 A | 10/1992 | Yagi et al. | |
| 5,262,101 A * | 11/1993 | Yagi et al. | ................... 264/410 |
| 5,433,897 A | 7/1995 | Kanome et al. | |
| 5,456,871 A | 10/1995 | Harada | |
| 6,250,904 B1 | 6/2001 | Reddy et al. | |
| 6,863,517 B2 * | 3/2005 | Nissel | ........................ 425/141 |

FOREIGN PATENT DOCUMENTS

| | | |
|---|---|---|
| CN | 1076652 A | 9/1993 |
| JP | 09-155948 | 6/1997 |
| JP | 10-034748 | 2/1998 |

OTHER PUBLICATIONS

Chinese Office Action issued on Jul. 25, 2008 in the counterpart Chinese Patent Application No. 200610084845.9.

(Continued)

*Primary Examiner*—Joseph S Del Sole
*Assistant Examiner*—Robert Dye
(74) *Attorney, Agent, or Firm*—DLA Piper LLP (US)

(57) ABSTRACT

An sheet forming apparatus selectively uses two control modes: a constant roller gap control mode where a roller gap is controlled by a roller gap adjustment means so that the roller gap converges a predetermined control target value; and a constant pressing load control mode where the roller gap is controlled by the roller adjustment means so that a pressing load converges a predetermined control target value.

17 Claims, 7 Drawing Sheets

OTHER PUBLICATIONS

English language translation of the Chinese Office Action issued on Jul. 25, 2008 in the counterpart Chinese Patent Application No. 200610084845.9.
English Abstract of JP 09-155948.
English Abstract of JP 10-034748.
English Language machine translation of JP 09-155948.
English Language machine translation of JP 10-034748.
Office Action issued in U.S. Appl. No. 11/465,370 mailed Jan. 21, 2009.
Office Action issued in U.S. Appl. No. 11/465,370 on Aug. 20, 2009.
Chinese Office Action issued in CN 200610084845.9 on Jul. 3, 2009.
English Translation of Chinese Office Action issued in CN 200610084845.9 on Jul. 3, 2009.
Notice of Allowance issued in U.S. Appl. No. 11/465,370 on Mar. 5, 2010.

* cited by examiner

SHEET FORMING APPARATUS AND ROLLER GAP CONTROL METHOD

BACKGROUND OF THE INVENTION

The present invention relates to sheet forming apparatuses and roller gap control methods, and more particularly to a sheet forming apparatus and a roller gap control method using a touch roller to form a sheet by passing through the sheet between two rollers so that both surfaces of the sheet contact the two rollers.

Sheet forming apparatuses using a extrusion molding method, disclosed in Japanese Patent Laid-Open Publications No.H9-155948 and No.H10-34748, comprise two rollers placed in parallel at a distance. The sheet forming apparatuses form a sheet by passing through the sheet (melted resin supplied from T-die) between the rollers which are rotatively driven, so that the both surfaces of the sheet contact the rollers.

The rollers have roller supporting housings (bearing housing), respectively, between which a wedge member is inserted with a gap. Since one roller supporting housing is pressed against the other roller supporting housing by means of a hydraulic cylinder apparatus, the gap is adjusted by controlling the insertion depth of the wedge member.

SUMMARY OF THE INVENTION

However the sheet forming apparatus has issues: the wedge member inserted between the two roller supporting housings makes it difficult to precisely measure the strength of load substantively acting on the sheet that is formed between the two rollers, and thus the sheet forming apparatus can merely keep the gap in constant width.

When a forming process started (when a forming condition modified), increasing the pressing amount of the melting resin supplied from the T-die requires enlarging the gap between the rollers. If the timing of the enlarging is delayed, a melt bank formed at an upper portion of the gap becomes larger. Further an increase in size of the melt bank over regular size causes a roller rotary drive motor to be overloaded, and the melting resin of the melt bank to be adhered to the T-die lip thereby messing the T-die lip.

On the other hand, when a forming process started (when a forming condition modified), increasing a take-off speed of the sheet requires narrowing the gap between the rollers because the sheet becomes thinner. If the timing of the narrowing is delayed, both surfaces of the sheet become detached from the rollers. The detachment of the sheet from the rollers brings insufficient cooling of the sheet by the rollers, and the sheet remains soft due to poor hardening. The sheet thus slips off the roller at the lower portion of the roller.

At an automatic start-up, speeding-up with synchronizing a rotation number of the extruding machine and a roller speed does not immediately increase the pressing amount of melting resin, even through the rotation number is increased. The sheet thickness thus becomes thinner or the melt bank fades away, so that the sheet slips down from the roller gap.

An object of the present invention is to automate a roller gap control and to facilitate an operation at start-up and in modification of conditions.

To achieve the above described object, a first aspect of the present invention provides a sheet forming apparatus, having two rollers placed in parallel at a distance and forming a sheet by passing through the sheet between the two rollers rotatively driven with both surfaces of the sheet contacting the two rollers, the sheet forming apparatus comprising: a roller gap adjustment unit adjusting a roller gap by moving at least one of the two rollers; and a roller gap control unit with two control modes: a constant roller gap control mode where the roller gap adjustment unit adjusts the roller gap between the two rollers so that the roller gap between the two rollers converges a predetermined control target value; and a constant pressing load control mode where the roller gap adjustment unit adjusts a value of roller gap between the two rollers so that a pressing load acting on the roller converges a predetermined control target value, controlling the roller gap by selectively running either one of the two modes.

To achieve the above described object, a second aspect of the present invention provides a roller gap control method in a sheet forming apparatus, having two rollers placed in parallel at a distance and forming a sheet by passing through the sheet between the two rollers rotatively driven with both surfaces of the sheet contacting the two rollers, the roller gap control method comprising: moving at least one of the two rollers; measuring a roller gap between the two rollers; measuring a pressing load acting on the roller; and running selectively either one control mode of two modes: a constant roller gap control mode where the roller gap between the two rollers are adjusted so that the roller gap between the two rollers converges a predetermined control target value; and a constant pressing load control mode where the roller gap between the two rollers is adjusted so that the pressing load acting on the roller converges a predetermined control target value.

DETAILED DESCRIPTION OF THE PREFERRED EMBODIMENTS

Figure 1:
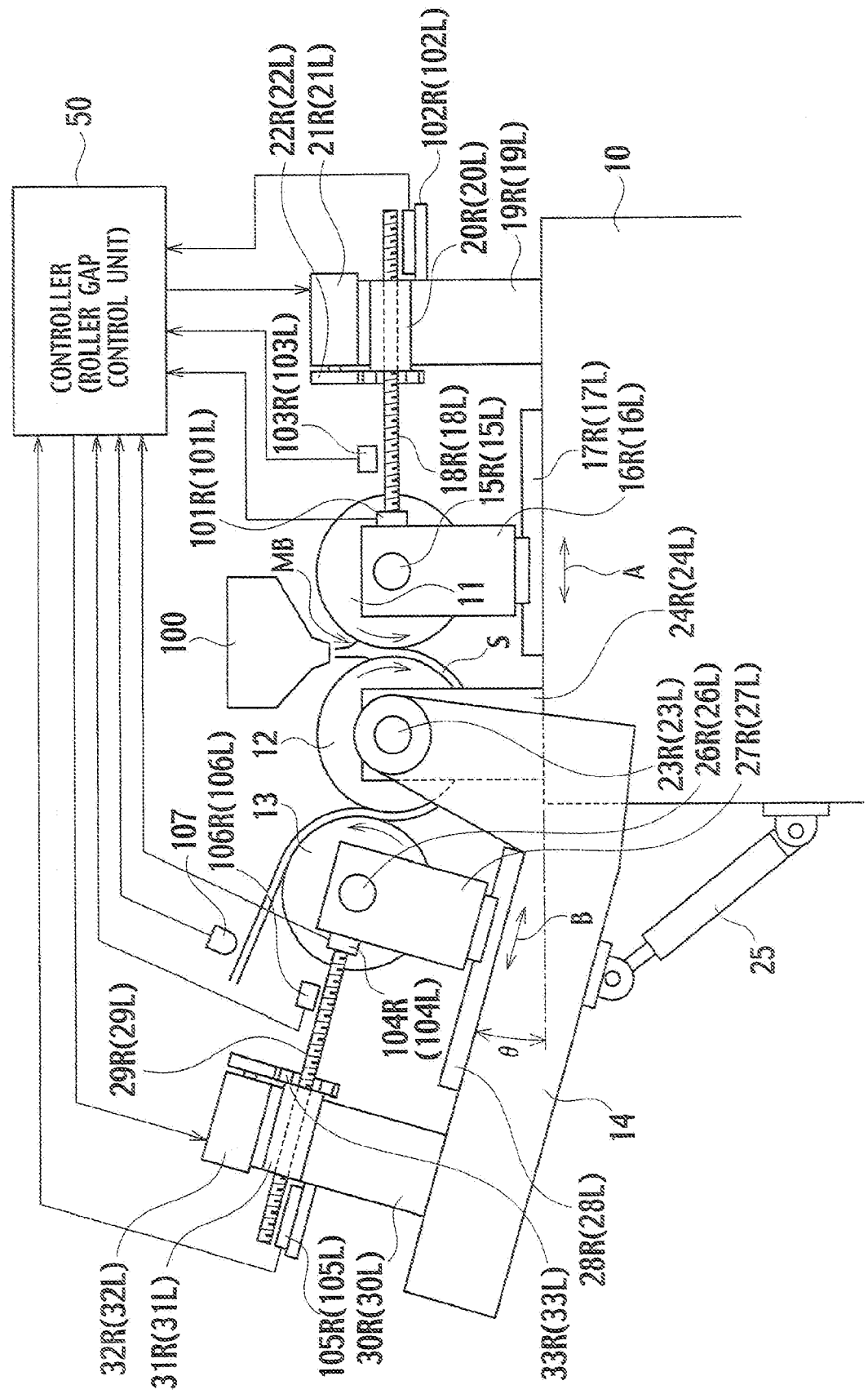
FIG. 1 is a view showing the whole structure of a sheet forming apparatus in one embodiment according to the present invention.

With reference to FIG. 1 a sheet forming apparatus in one embodiment according to the present invention is described.

The sheet forming apparatus comprises a fixed base 10 on which a first roller 11 and a second roller 12 are provided, and a pivot base 14 on which a third roller 13 is provided. The first roller 11, the second roller 12, and the third roller 13 are arranged in parallel with each other.

The first roller 11 is mounted for rotation about its center shaft with shaft ends 15R, 15L supported by bearing housings 16R, 16L. The bearing housings 16R, 16L are movably engaged with linear guides 17R, 17L provided on the fixed base 10. The first roller 11 is thus movable for the second roller 12 in the direction of A where a roller gap is increased and decreased.

The bearing housings 16R, 16L are fixedly connected to end portions of feed screw members 18R, 18L, respectively, by means of load cells 101R, 101L. The load cells 101R, 101L serve as pressing load measurement means for measuring the pressing load acting on right-and-left bearing portions of the first roller 11.

On the fixed base 10 feed nut supports 19R, 19L are fixedly mounted to rotatably support feed nuts 20R, 20L. The feed screw members 18R, 18L are screw engaged to the feed nuts 20R, 20L, respectively. On the feed nut supports 19R, 19L, servomotors 21R, 21L are mounted in drive connection with the feed nuts 20R, 20L by gear trains 22R, 22L. The servomotors 21R, 21L rotationally drive the feed nuts 20R, 20L.

Rotation of the feed nut 20R (20L) by the servomotor 21R (21L) moves the feed screw member 18R (18L) in the direction of shaft line (in the direction of A), thereby moving the bearing housing 16R (16L) in the direction of A depending on a rotation angle (amount of rotation) of the servomotor 21R (21L).

This configures a roller gap adjustment means at respective shaft end portions of the first roller 11.

Linear sensors 102R, 102L, which serve as roller gap measuring means for measuring roller gap between the first roller 11 and the second roller 12, are attached to the feed nut supports 19R, 19L. The linear sensors 102R, 102L detect positions of the feed screw members 18R, 18L in the direction of shaft line. The linear sensor 102R measures a right side roller gap (a roller gap at one side of the roller) between the first roller 11 and the second roller 12. The linear sensor 102L measures a left side roller gap (a roller gap at other side of the roller) between the first roller 1 and the second roller 2.

Temperature sensors 103R, 103L, which are temperature measuring means for measuring temperatures of the roller gap adjustment means, are provided to detect temperatures of the feed screw members 18R, 18L.

The second roller 12 is mounted for rotation about its center shaft with shaft ends 23R, 23L supported by bearing housings 24R, 24L that are fixedly mounted on the fixed base 10.

Pivot base 14 is pivotally mounted about a center of rotation of the second roller 12, which enables to tilt the pivot base 14 relative to a horizontal plane. The pivot base 14 is connected to a hydraulic cylinder device 25. The hydraulic device 25 enables to keep the pivot base 14 with a variable angle θ relative to the horizontal plane. Instead of the hydraulic cylinder device 25, it is possible to use a feed screw mechanism by means of servomotor driving for pivotal driving of the pivot base 14.

This enables the third roller 13 to pivot about the center of rotation of the second roller 12 and the pivot base 14 to be kept tilted relative to the horizontal plane. Changing the angle θ (in FIG. 1) provides the winding length (contact length) of a sheet S around the second roller 12 and the third roller 13 to be varied. In other words, changing a position of the third roller 13 relative to the second roller 12 enables to change the angle θ.

The third roller 13 is mounted for rotation about its center shaft with shaft ends 26R, 26L supported by bearing housings 27R, 27L. The bearing housings 27R, 27L are movably engaged with linear guides 28R, 28L provided on the pivot base 14. The third roller 13 is thus movable for the second roller 12 in the direction of B where a roller gap is increased and decreased.

The bearing housings 27R, 27L are fixedly connected to the end portions of feed screw members 29R, 29L, respectively, by means of load cells 104R, 104L. The load cells 104R, 104L serve as pressing load measurement means for measuring the pressing load acting on right-and-left bearing portions of the third roller 13.

On the pivot base 14 feed nut supports 30R, 30L are fixedly mounted to rotatably support feed nuts 31R, 31L. The feed screw members 29R, 29L are screw engaged to the feed nuts 31R, 31L, respectively. On the feed nut supports 30R, 30L servomotors 32R, 32L are mounted in drive connection with the feed nuts 31R, 31L by means of gear trains 33R, 33L. The servomotors 32R, 32L rotationally drive the feed nuts 31R, 31L.

Rotation of the feed nut 31R (31L) by the servomotor 32R (32L) moves the feed screw member 29R (29L) in the direction of shaft line (in the direction of B), thereby moving the bearing housing 27R (27L) in the direction of B depending on a rotation angle (amount of rotation) of the servomotor 32R (32L).

This configures a roller gap adjustment means at respective shaft end portions of the third roller 13.

Linear sensors 105R, 105L, which serve as roller gap measuring means for measuring roller gap between the second roller 12 and the third roller 13, are attached to the feed nut supports 30R, 30L. The linear sensors 105R, 105L detect positions of the feed screw members 29R, 29L in the direction of shaft line. The linear sensor 105R measures a right side roller gap (a roller gap at one side of the roller) between the second roller 12 and the third roller 13. The linear sensor 105L measures a left side roller gap (a roller gap at other side of the roller) between the second roller 12 and the third roller 13.

Temperature sensors 106R, 106L, which are temperature measuring means for measuring temperatures of the roller gap adjustment means, are provided to detect temperatures of the feed screw members 29R, 29L.

Although not shown in the figure, electric motors for rotary driving are respectively connected to the first roller 11, the second roller 12, and the third roller 13. The electric motors rotate the first roller 11 in counterclockwise direction, the second roller 12 in clockwise direction, and the third roller 13 in counterclockwise direction.

Above the roller gap between the first roller 11 and the second roller 12, a T-die 100 is provided with a longer length in the direction of roller shaft. The T-die 100 discharges melting resin from its lip portion to the roller gap, thereby forming a melt bank MB of melting resin at an upper portion of the roller gap.

Since the first roller is rotated counterclockwise, the second roller is rotated clockwise and the third roller is rotated counterclockwise, the sheet is formed in a touch roll method. Both surfaces of the sheet S contact the first roller 11 and the second roller 12 at the roller gap between the first and second rollers, and further contact the second roller 12 and the third roller 13 at the roller gap between the second and the third rollers.

In a transport path of the formed sheet S a sheet thickness measuring unit 107 is provided. The sheet thickness measuring unit 107 adopts a non-contact type such as laser, beta-ray, infrared ray, X-ray, or air, and measures a thickness of the sheet S while transported. Although the sheet thickness measuring unit 107 is just provided near the third roller 13 in FIG. 1, the sheet thickness measuring unit 107 is practically provided at a distance of 5-20 mm from the third roller 13 so as to stabilize the sheet thickness measuring.

A controller 50 (roller gap control unit), electronically controlling using a microcomputer, is provided as a roller gap control means. The controller 50 receives signals from the load cells 101R, 101L, 104R, 104L, the linear sensors 102R, 102L, 150R, 150L, the temperature sensors 103R, 103L, 106R, 106L, and the sheet thickness measuring unit 107. The controller 50 controls the servomotors 21R, 21L for the roller gap control between the first roller 11 and the second roller 12, and the servomotors 32R, 32L for the roller gap control between the second roller 12 and the third roller 13.

The controller 50 is provided with two practicable control modes, a constant roller gap control mode and a constant pressing load control mode. The controller 50 selectively runs either one of the control modes. The constant roller gap control mode is a mode where the roller gap is controlled by the servomotors 21R, 21L, 32R, 32L, so that the roller gaps, between the first roller 11 and the second roller 12 measured by the linear sensors 102R, 102L and between the second roller 12 and the third roller 13 measured by the linear sensors 105R, 105L, converge a predetermined control target value. The constant pressing load control mode is a mode where the roller gap is controlled by the servomotors 21R, 21L, 32R, 32L, so that the pressing loads, on the first roller 11 measured by the load cells 101R, 101L and on the third roller 13 measured by the load cells 104R, 104L, converges a predetermined control target value.

In this embodiment, when a sheet forming process is started or a sheet forming condition is modified, in specific immediately after the sheet forming process is started or the modification of forming conditions is started, the controller 50 controls the roller gap under the constant pressing load control mode. Then, if the starting of the sheet forming process is completed or at least one of conditions is satisfied: a predetermined time passes since the modification of forming conditions is completed, variations in width of roller gap measured by the 102R, 102L, 105R, 105L converge within a predetermined range, and variations in thickness of the sheet S measured by the sheet thickness measuring unit 107 converge within a predetermined range, the controller 50 switches the control mode from the constant pressing load control mode to the constant roller gap control mode.

When the first roller 11 is kept away from the second roller 12 for preparation, at the beginning of sheet forming for instance, it is preferable to use a positional control to narrow the roller gap. That is, adjust a poison of the first roller 11 toward the second roller 12 to a position where the roller gap is wider by a predetermined width than the thickness of the sheet to be formed or a predetermined width, and then select the constant pressing load control mode to control the roller gap. There are two reasons why the positional control is preferable:

Firstly, moving the roller all along under the constant pressing load control mode requires moving together a heavy roller rotary driving portion mounted only on a roller rotary driving side (only one side) of the roller. Thus, the moving speed slows down and there is a possibility to damage a bearing portion due to roller's misalignment. Moving the roller under the positional control to a position where the roller nearly contacts the sheet enables to move the roller in parallel. Then, contacting the roller to the sheet under the constant pressing load control mode enables to set easily the roller gap to an appropriate width.

Secondly, during moving the roller to narrow the roller gap, an exact roller gap is not known, so that an appropriate roller gap cannot be determined. Thus moving the roller under the roller gap control has a possibility to cause the size of melt bank to become too large, or too small so that the sheet breaks. These troubles are prevented by adjusting the roller position under the positional control, until the roller gap becomes a roller gap wider by a predetermined width than the thickness of sheet or a predetermined width.

In switching the control mode to the constant roller gap control mode, the controller 50 sets, as a control target value, a roller gap measured immediately before the mode switching or an average of roller gaps measured during a predetermined time. In switching the control mode to the constant pressing load control mode, the controller 50 sets, as a control target value, a pressing load measured immediately before the mode switching or an average of pressing load measured during a predetermined time.

The controller 50 works based on the above control mode switch. However, under the constant pressing load control mode, if the roller gap becomes less or equal to a predetermined minimum roller gap, the controller 50 forces to switch the control mode to the constant roller gap control mode so as to prevent the rollers from contacting each other. The roller gap between the first roller 11 and the second roller 12 is measured by the linear sensors 102R, 102L and the roller gap between the second roller 12 and the third roller 13 is measured by the linear sensors 105R, 105L.

Under the constant pressing load control mode, if a difference between the right-and-left roller gaps measured by the line sensors 102R, 102L or 105R, 105L becomes greater or equal to a predetermined acceptable value, the controller 50 balances the right-and-left pressing load. That is, the controller decreases a control target value of pressing load on one side with a narrower roller gap and increases a control target value of pressing load on the other side with a wider roller gap.

Under this pressing load control, right-and-left pressing loads are adjusted so that the sum of which is kept constant: PRct+PLct=Prl, where PRct is a right-side control target value; PLct a left-side control target value; Prl=constant.

A right-side control target value PRct and a left-side control target value PLct are set as $$PRct = Prl/2 + f(Grs - GLs) \quad (1)$$

$$PLct = Prl/2 - f(Grs - GLs) \quad (2)$$

where GRs is a measurement value of roller gap measured by the linear sensor 102R or 105R, GLs is a measurement value of roller gap measured by the linear sensor 102L or 105L, and f(Grs−GLs) a correction function. For example, f(GRs−GLs) =C(GRs−GLs) with an arbitrary correction coefficient C, is applied as a direct function.

The load cells 101R, 101L measure the pressing load acting on the right-and-left bearing portions of the first roller 11, and the load cells 104R, 104L measure the pressing load acting on the right-and-left bearing portions of the third roller 13. The controller 50 determines a deviation of pressing load between each of the above measured values of pressing load and the corresponding control target value of pressing load obtained as the above. Based on the deviation of pressing load, the controller 50 running the constant pressing load control mode, sets the control target value of roller gap. The control target value of roller gap is set respectively for the right-and-left side roller gaps between the first roller 11 and the second roller 12 and between the second roller 12 and the third roller 13. Then, the controller 50 adjusts each of the above roller gaps by servomotors 21R, 21L, 32R, 32L, so that the deviation of roller gap between each of the roller gaps measured by the linear sensors 102R, 102L, 105R, 105L and the corresponding control target value of roller gap set by the controller 50, becomes zero.

That is to say, the above steps configure a cascade controlling, where the right-and-left roller gaps are determined from the right-and-left pressing loads, thereby keeping the right-and-left roller gaps the same.

If the pressing loads on right-and-left sides are merely kept the same, the roller does not contact the sheet in parallel when the sheet thickness becomes unequal in width direction and the melt bank encourages the roller misalignment, thereby having a possibility to damage the bearing portions. However, the above cascade controlling enables to form the sheet in stable condition.

Moreover, the controller performs the following correction calculations: (1) Correction of a measured value of roller gap based on a temperature; (2) Correction of a measured value of roller gap based on an amount (volume) of elastic deformation; (3) Correction of a measured value of pressing load based on a weight and an angle.

(1) Correct a measured roller gap, between the first roller 11 and the second roller 12 measured by the linear sensors 102R, 102L and between the second roller 12 and the third roller 13 measured by the linear sensors 105R, 105L, based on a temperature measured by the temperature sensors 103R, 103L, 106R, 106L. The correction calculation of a value of roller gap for temperature compensation is performed by:

$$Gca = Gs - \xi(Ts - Td) \quad (3)$$

where Gca is a corrected value of roller gap; Gs a measured value of roller gap; Td a standard temperature; Ts a measured value of temperature; and $\xi$ a heat expansion constant for feed screw.

The control 50 runs the constant roller gap control mode with the corrected value of roller gap Gca as Gc.

(2) Determine an amount (volume) of elastic deformation on each part of the apparatus from the pressing load measured by the load cells 101R, 101L, 104R, 104L. Then, correct a measured value of roller gap, between the first roller 11 and the second roller 12 measured by the linear sensors 102R, 102L and between the second roller 12 and the third roller 13 measured by the linear sensors 105R, 105L, based on the volume of elastic deformation.

The correction calculation for a value of roller gap is performed by $$Gce = Gs + Ps/k \quad (4)$$

where k is a spring constant for a roller and a roller bearing; Gce a corrected value of roller gap; Gs a measured value of roller gap; Ps a measured value of pressing load. The spring constant k is set as a proper value by CAE or pressing test, for instance.

It is also possible to determine the volume of elastic deformation by obtaining data in advance from an experiment or simulation on a production machine, about the elastic deformation of the machine under each status, saving the obtained data as a database in a storage means (not shown) of the controller 50 and then searching the database.

The controller 50 runs the constant roller gap control mode with the corrected value of roller gap Gce as Gc.

(3) Correct the measured pressing load based on weights of the third roller 13 and the bearing housings 27R, 27L which support the third roller 13, and the angle θ. The correction calculation of a value of pressing load is performed by:

$$Pcw = Ps - \{(Wr/2) + Wh\} \sin\theta \quad (5)$$

where Pcw is a corrected value of pressing load; Ps a measured value of pressing load; Wr a roller weight; and Wh a bearing housing weight. The angle θ is measured by an angle sensor (now shown) and the measured value is input to the controller 50.

In the embodiment according to the present invention, the size of the melt bank MB changes in the following manner: switch the control mode to the constant pressing load; change the control target value of pressing load in the constant pressing load based on the measured value of pressing load in switching; and then switch back the control mode to the constant roller gap control mode with the currently measured value of roller gap as the control target value if at least one of conditions is satisfied: a predetermined time passes since the control target value of pressing load is changed, variations in width of roller gap converge within a predetermined range and variations in thickness of the formed sheet converge within a predetermined range.

On the other hand, in prior art, the melting bank size is changed by merely adjusting the roller gap, where a delicate adjustment is difficult and takes a long time until the melting bank is stabilized after the roller gap is adjusted.

The above steps enable the size of the melt bank to change in short time. Decreasing the pressing load makes the roller gap temporarily wider and the resin passing through the rollers increase. Then, the roller gap becomes narrower and is stabilized at a proper width as the melt bank becomes smaller. Increasing the pressing load makes the roller gap temporarily narrower and the resin passing through the rollers decrease. Then, the roller gap becomes wider and is stabilized at a proper width as the melt bank becomes larger. The bank size and the loading are approximately in proportional relationship, which enables to adjust the bank size easily to a predetermined size.

Figure 2:
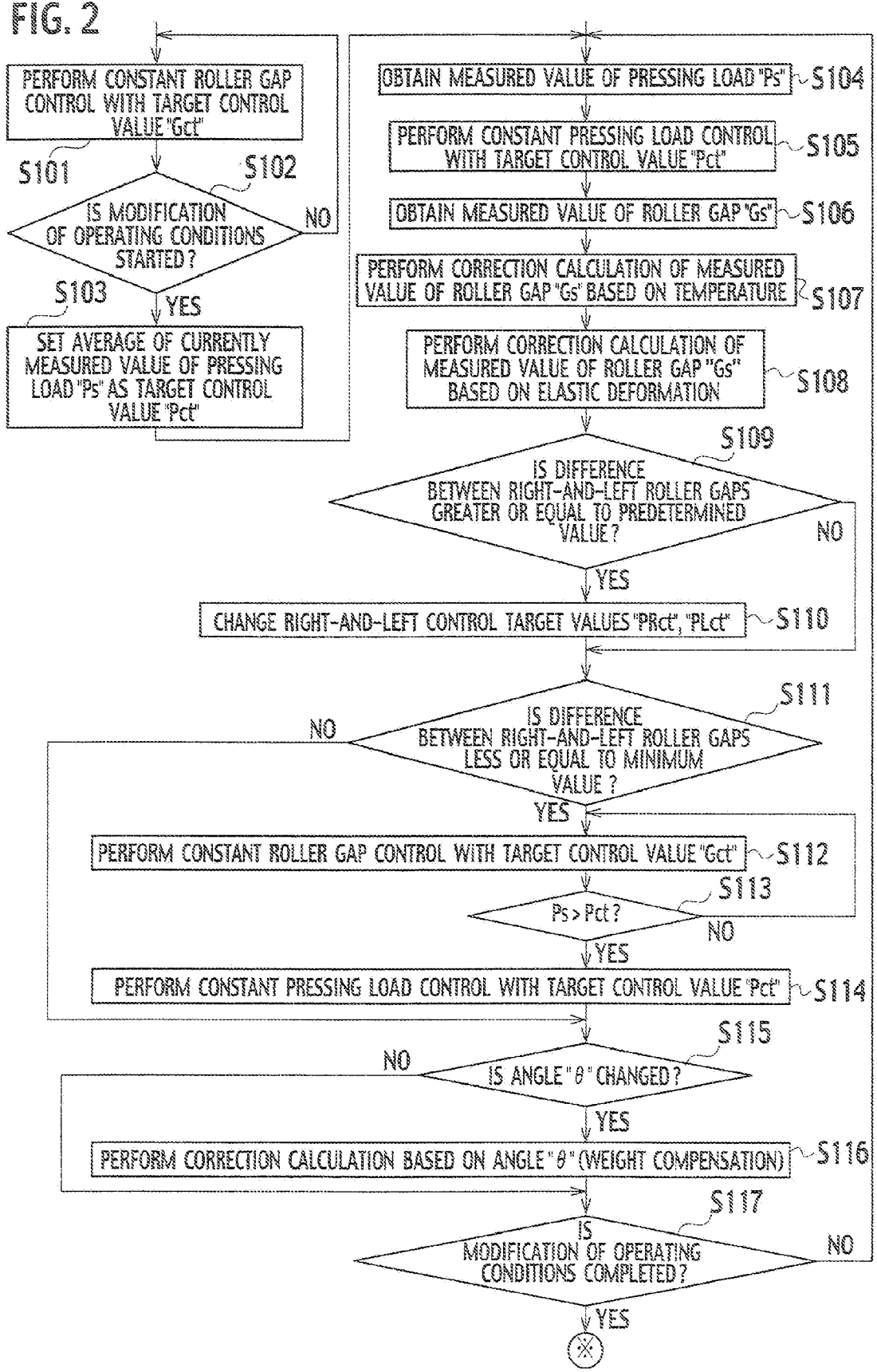
FIG. 2 is a flow chart showing a roller gap control method in the embodiment (first half).
Figure 3:
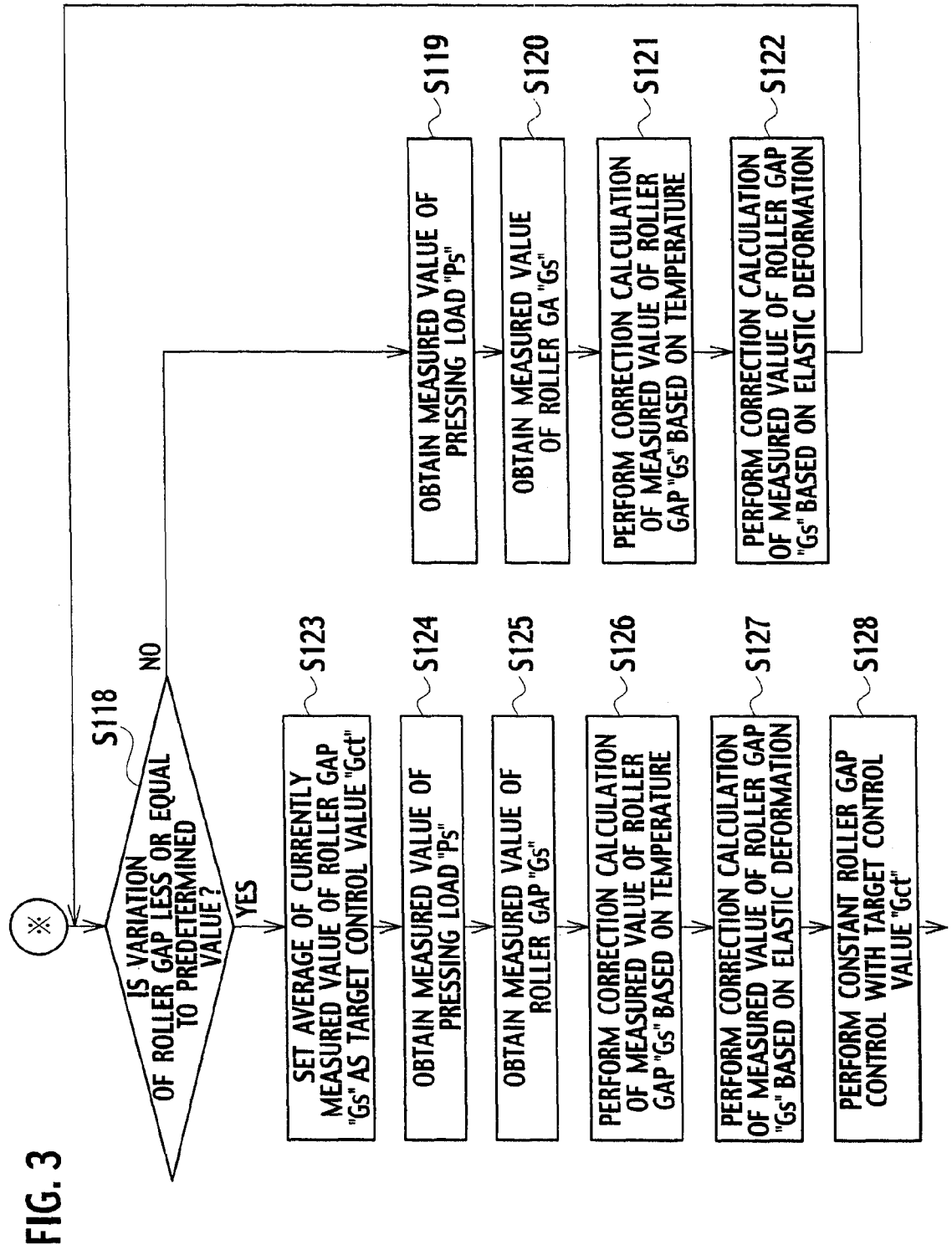
FIG. 3 is a flow chart showing a roller gap control method in the embodiment (last half).
Figure 4:
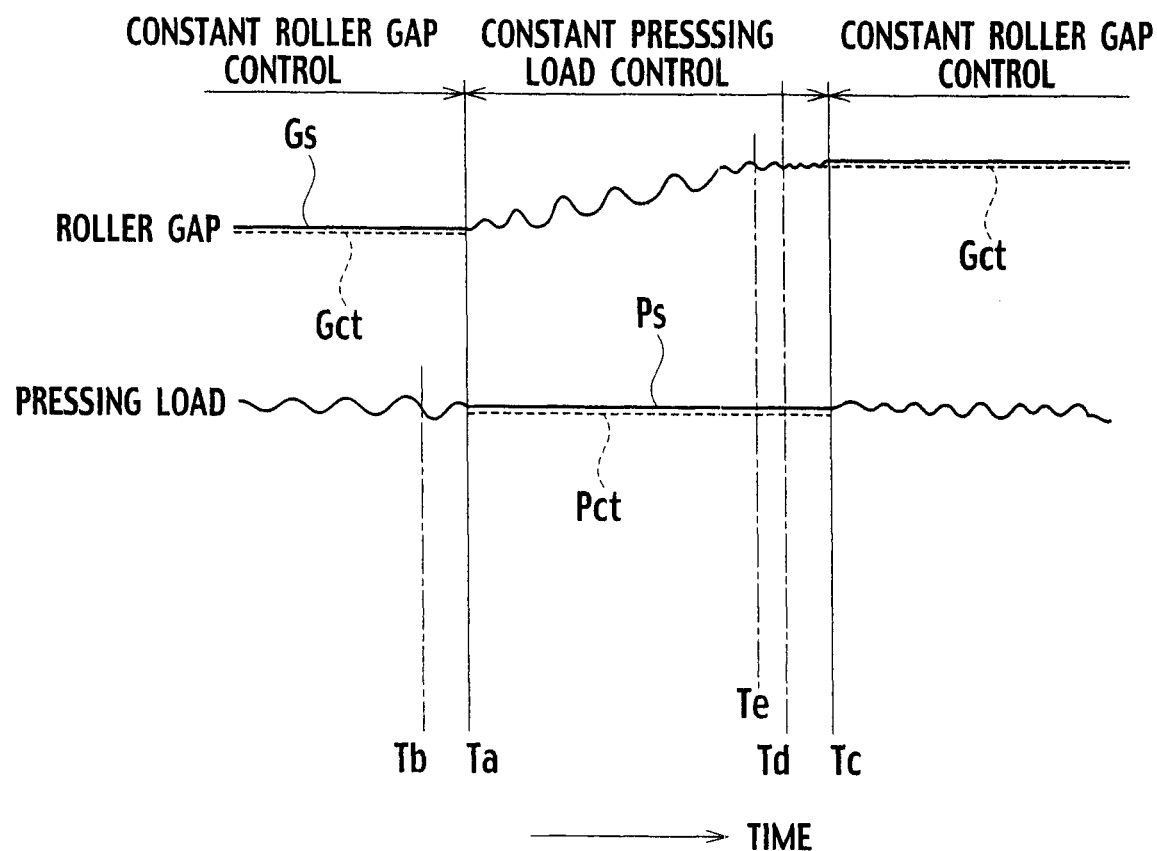
FIG. 4 is a time chart showing the roller gap control method in the embodiment.

Next, a roller gap control method in the embodiment is described with reference to a flow chart in FIGS. 2 and 3, and a time chart in FIG. 4.

Perform the constant roller gap control with the control target value Gct (step S101). At the time Ta, if a modification of operating conditions (amount of melting resin, sheet thickness, roller rotation speed) is started (step S102 YES), determine an average (average during a predetermined time) of measured values of pressing load Ps between time Ta and time Tb, a litter earlier than Ta. Set the average as the control target value Pct in the constant pressing load control mode (step S103).

The measured value Ps is the average of right-and-left measured values PRs, PLs, and the control target value Pct is defined by Pct=PRct=PLct. The control target value Pct is set respectively for controlling the roller gap between the first roller 11 and the second roller 12 and for controlling the roller gap between the second roller 12 and the third roller 13.

Then, obtain a currently measured value of pressing load Ps (right-and-left measured values PRs, PLs) (step S104).

Then, switch the control mode to the constant pressing load control mode, and perform the constant pressing load control to adjust the roller gap so that the currently measured value of pressing load Ps converges the control target value of pressing load Pct (step S105). That is, when or right after the modification of operating condition is started, the constant pressing load control is started. Then, adjust the roller gap between the first roller 11 and the second roller 12 by the servomotors 21R, 21L, so that the pressing load of the first roller 11 measured by load cells 101R, 101L (measured value Ps) converges the control target value Pct. Adjust the roller gap between the second roller 12 and the third roller 13 by the servomotors 32R, 32L, so that the pressing load of the third roller 13 measured by load cells 104R, 104L (measured value Ps) converges the control target value Pct.

There is a proportional relationship between the roller pressing load and the melt bank size. Thus, controlling the pressing load to be constant prevents the melt bank from growing excessively smaller or larger, thereby keeping the melt bank in a proper size. When the sheet forming condition is modified, this prevents the problems: overloading of a roller rotary drive motor (not shown); adhering the melting resin of the melt bank to the T-die lip, and the rollers not contacting the both surfaces of the sheet S or running out of the melt bank so that the sheet S slips down from the roller gap.

When the sheet forming is started, as well as when the sheet forming condition is modified, the constant pressing load control is performed allowing for an automatic startup. This prevents the problems: overloading of a roller rotary drive motor (not shown); adhering the melting resin of the melt bank to the T-die lip; and the poor cooling of the sheet S due to the detachment from the rollers, the sheet S becoming thinner, or running out of the melt bank so that the sheet S slips down from the roller gap.

Then, obtain the measured value of roller gap Gs (right-and-left measured values GRs, GLs) (step S106). Gs exists for each of the roller gaps, between the first roller 11 and the second roller 12 and between the second roller 12 and the third roller 13.

Perform the temperature compensation calculation on the measured value of roller gap Gs according to the formulation (3) (step S107). Perform the elastic deformation compensation calculation on the measured value of roller gap Gs according to the formulation (4) (step S108).

Determine whether a difference between the right-and-left measured values after corrections (|Grs−GLs|) is greater or equal to the predetermined value (step S109). If the difference between the corrected right-and-left measured values is greater or equal to the predetermined value, so as to balance the right-and-left pressing loads, change the right-and-left control target values PRct, PLct according to the formulation (1), (2) (step S110). That is, the control target value of pressing load on one side with a narrower roller gap is decreased, and the control target value of pressing load on the other side with a wider roller gap is increased.

Determine whether the corrected roller gap Gc is less or equal to a minimum value (step S111). If the corrected roller gap Gc is less or equal to the minimum value, so as to prevent the rollers from contacting each other, switch the control mode to the constant roller gap control mode and perform the constant roller gap control with the control target value Gct (step S112). The control target value Gct is set to a value slightly greater than the minimum value of roller gap.

Determine whether the measured value of pressing load Ps is greater or equal to the control target value of pressing load Pct (step S113). If Ps>Pct and the roller gap Gc is to be kept greater or equal to the minimum value under the constant pressing load control with the control target value Pct, switch back the control mode to the constant pressing load control mode (step S114).

If Ps<=Pct, continue the constant roller gap control.

If the corrected value of roller gap Gc is greater or equal to the minimum value, determine whether the angle θ is changed (step S115). If the angle θ is changed, perform the correction calculation (weight compensation) on the measured value of pressing load Ps (right-and-left measured values PRs, PLs) according to the formulation (5) (step S116). The correction calculation is performed only for the measured value of pressing load Ps on the third roller 13.

Determine whether the modification of operating condition is completed (step S117). The above steps S104 to S116 are repeated until the modification of operating condition is completed.

If the modification of operating condition is completed as of time Te, a completion determination of the constant pressing load control is started. The completion determination of the constant pressing load control determines whether a variation of the corrected value of roller gap Gc is less or equal to a determined value (step S118). It is also possible to do the completion determination by whether a predetermined time passes since the completion of sheet forming starting or the completion of modification of operating condition Te, or whether variations of the sheet S thickness converge within a predetermined range.

If the variation of the value of roller gap Gc is not less or equal to the determined value, repeat following steps and continue the constant pressing load control: obtain a currently measured value of pressing load Ps (step S119) and then a currently measured value of roller gap Gs (right-and-left measured values GRs, GLs) (step S120); perform the temperature compensation calculation on the measured value of roller gap Gs according to the formulation (3) (step S121); perform the elastic deformation compensation calculation on the measured value of roller gap Gs according to the formulation (4) (step S122); and determine whether the variation of the corrected value of roller gap Gc is less or equal to the predetermined value (step S118).

If the corrected value of roller gap Gc is less or equal to the minimum value as of Tc, determine an average of the measured values of roller gap Gs measured between Tc and Td, a little before Tc and set the average as Gct, the control target value of the constant roller gap control (step S123).

The measured value of roller gap Gs is an average of the right-and-left measured values GLs, GRs. The control target value Gct is defined by Gct=GRct=GLct. The control target value Gct is set respectively between the first roller 11 and the second roller 12, and between the second roller 12 and the third roller 13.

Obtain a currently measured value of pressing load Ps (right-and-left measured values PLs, PRs) (step S124).

Obtain a measured value of roller gap (right-and-left measured values GRs, GLs) (step S125).

Perform the temperature compensation calculation on the measured value of roller gap Gs according to the formulation (3) (step S126). Perform the elastic deformation compensation calculation on the measured value of roller gap Gs according to the formulation (4) (step S127).

Switch the control mode to the constant roller gap control mode, and operates the constant roller gap control with the control target value Gct (step S128). Adjust the roller gap between the first roller 11 and the second roller 12 by means of the servomotors 21R, 21L, so that the roller gap measured by linear sensors 102R, 102L (corrected value of roller gap Gc) converges the control target value Gct. Adjust the roller gap between the second roller 12 and the third roller 13 by means of the servomotors 32R, 32L, so that the roller gap measured by linear sensors 105R, 105L (corrected value of roller gap Gc) converges the control target value Pct.

This enables to stabilize the thickness of the sheet S, thereby forming the sheet S with high quality.

In a stationary operation, except for when the sheet forming is started (start-up) or the operation condition is modified, the roller gap control is performed under the constant roller gap control mode, which enables to form the sheet with stable thickness.

In the above embodiment, a feed screw system by a servomotor driving is adopted as a roller gap adjustment means. It is also possible to use a bi-directional hydraulic pump by the servomotor driving or a hydraulic servo by a hydraulic cylinder device.

Figure 5:
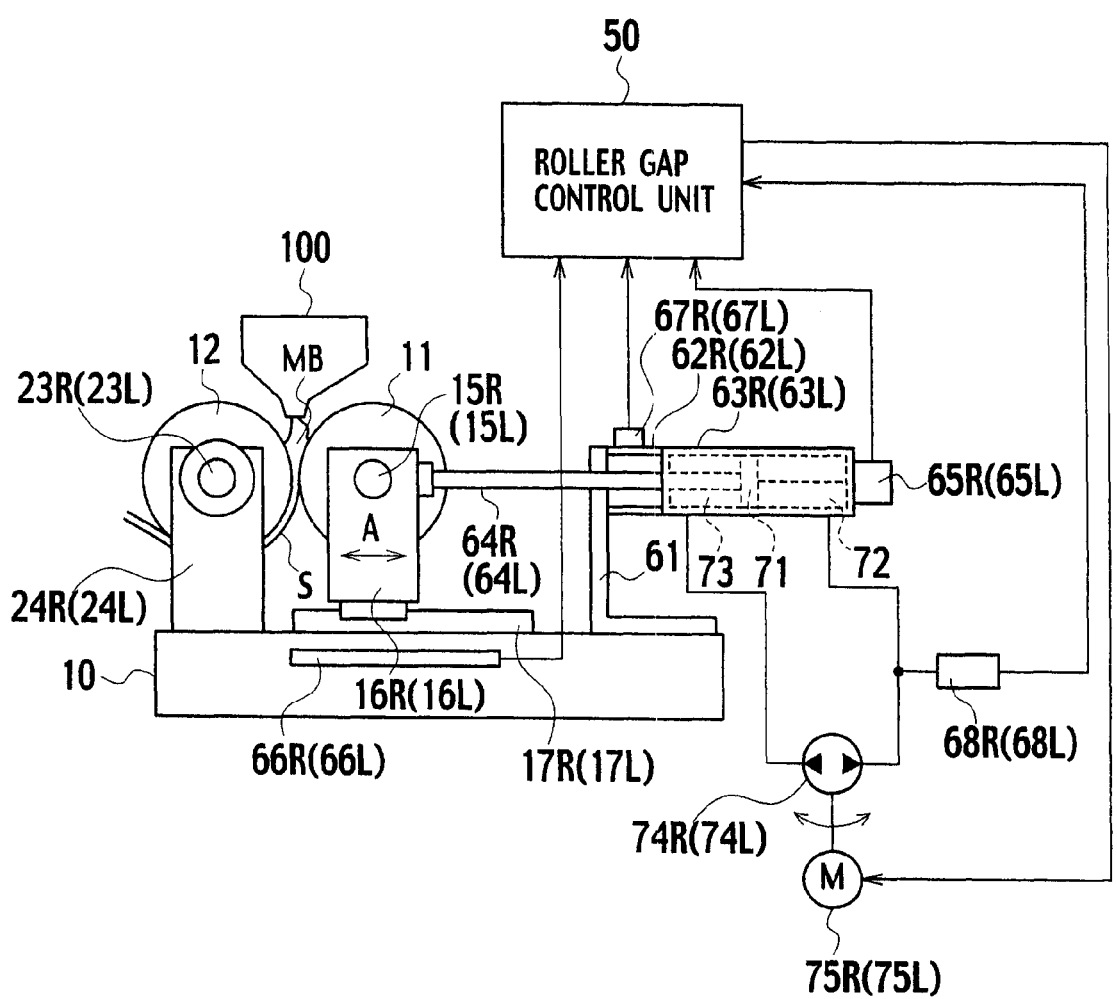
FIG. 5 is a view showing the whole structure of a sheet forming apparatus in another embodiment according to the present invention.

With reference to FIG. 5, another embodiment using the bi-directional hydraulic pump by the servomotor driving is described. In FIG. 5, the same reference number is put on a part corresponding to FIG. 1 and its description is omitted.

On the fixed base 10, right-and-left hydraulic cylinder devices 63R, 63L are mounted by means of a mounting member 61 and connecting tube bodies 62R, 62L. The hydraulic cylinder devices 63R, 63L are provided with piston rods 64R, 64L which are connected to bearing housings 16R, 16L on each end of the piston rods 64R, 64L. The hydraulic cylinder devices 63R, 63L, which are a double-acting type, respectively have cylinder chambers 72, 73 on both sides of the piston 71.

The hydraulic cylinder devices 63R, 63L, which change the roller gap by adjusting the roller position of the first roller 11, work as right-and-left roller gap adjustment means. Right-and-left bearing housings 16R, 16L are individually moved in the direction of A by hydraulic operation of the right-and-left hydraulic cylinder devices 63R, 63L.

Supplying hydraulic pressure to the cylinder chambers 72, 73 of the hydraulic cylinder devices 63R, 63L is done by means of bi-directional hydraulic pumps 74R, 74L driven by servomotors 75R, 75L.

The hydraulic cylinder devices 63R, 63L have built-in displacement gauges (position sensor) 65R, 65L. The displacement gauges 65R, 65L measure a piston position of the hydraulic cylinder devices 63R, 63L. The displacement gauges 65R, 65L work as a roller gap measurement means for measuring the position of the first roller 11, that is the roller gap between the first roller 11 and the second roller 12 which is fixedly positioned.

On the fixed base 10, displacement gauges (linear scale) 66R, 66L are mounted to detect positions of the right-and-left bearing housings 16R, 16L. The displacement gauges 66R, 66L work as a roller gap means for measuring the position of the bearing housings 16R, 16L, that is the roller gap between the first roller 11 and the second roller 12.

It is only necessary to provide either one of the displacement gauges 65R, 65L built in the hydraulic cylinder devices or the displacement gauges 66R, 66L at the bearing portion. Using existing hydraulic cylinder devices with built-in displacement gauges (displacement gauges 65R, 65L) reduces the number of parts. The displacement gauges 66R, 66L at the bearing portion enables high quality roller gap measurement. The displacement gauges 66R, 66L are not affected by elastic deformation or heat expansion at the piston rods 64R, 64L and at connection parts between the piston rods 64R, 64L and the bearing housings 16R, 16L. The selection of the displacement gauges depends on required specification.

It is also possible to provide both types of displacement gauges, 65R, 65L and 66R, 66L. The displacement gauges 65R, 65L built in the hydraulic cylinder devices is enabled to measure accurate vibrations of the hydraulic cylinder devices 63R, 63L. Correcting the measured value of roller gap measured by the displacement gauges 65R, 65L using the measured value of roller gap measured by the displacement gauges 66R, 66L, enables the roller gap measurement more accurate.

Load cells 67R, 67L are mounted on the connection tube bodies 62R, 62L. The load cells 67R, 67L, pressing load measurement means, measure a load acting on the connection tube bodies 62R, 62L and recognizes it as an equivalent pressing load acting on the first roller 11. It is also possible to put the load cells 67R, 67L on the connection portions of ends of the piston rods 64R, 64L and the bearing housings 16R, 16L (corresponding to the load cells 101R, 101L in FIG. 1.). Instead of the load cells 67R, 67L, pressure sensors 68R, 68L, which measure the supplied hydraulic pressure of the hydraulic cylinder devices 63R, 63L, are also used as a pressing load measurement means.

In this embodiment, although not shown in the figure, an electric motor for rotary driving are connected to the first roller 11 and the second roller 12 respectively, thus rotating the first roller 11 in counterclockwise direction and the second roller 12 in clockwise direction.

Above the roller gap between the first roller 11 and the second roller 12, a T-die 100 with a longer length in the direction of roller shaft, is provided. The T-die 100 discharges a melting resin from its lip portion to the roller gap between the first roller 11 and the second roller 12, thereby making a melt bank MB at an upper portion of the roller gap.

Since the first roller is rotated counterclockwise and the second roller is rotated clockwise, a sheet is formed by a touch roll method, with its both surfaces contacting the first roller 11 and the second roller 12 at the roller gap between the first and second rollers.

A roller gap controller 50, a roller gap control means, is electronically controlled by microcomputer. The roller gap controller 50 receives sensor signals (measurement information) from the displacement gauges 65R, 65L and/or 66R, 66L, the load cells 67R, 67L or the pressure sensors 68R, 68L, and controls the servomotors 75R, 75L, that is, the number of pump rotations for a roller gap control between the first roller 11 and the second roller 12.

The roller gap controller 50, as same as in the above embodiment, is provided with two practicable control modes, a constant roller gap control mode and a constant pressing load control mode. Either one of the control modes is selected at a time.

The constant roller gap control mode is a mode where the servomotors 75R, 75L control the number of pump rotations, so that the roller gap, between the first roller 11 and the second roller 12 measured by the displacement gauges 65R, 65L and/or 66R, 66L, converges to a predetermined control target value. The constant pressing load control mode is a mode where the servomotors 75R, 75L control the number of pump rotations, so that the pressing load of the first roller 11 converges a predetermined control target value. The pressing load of the first roller 11 is measured by the load cells 67R, 67L or determined from the supplied hydraulic pressure of the hydraulic cylinder devices 63R, 63L measured by the pressure sensors 68R, 68L.

Figure 6:
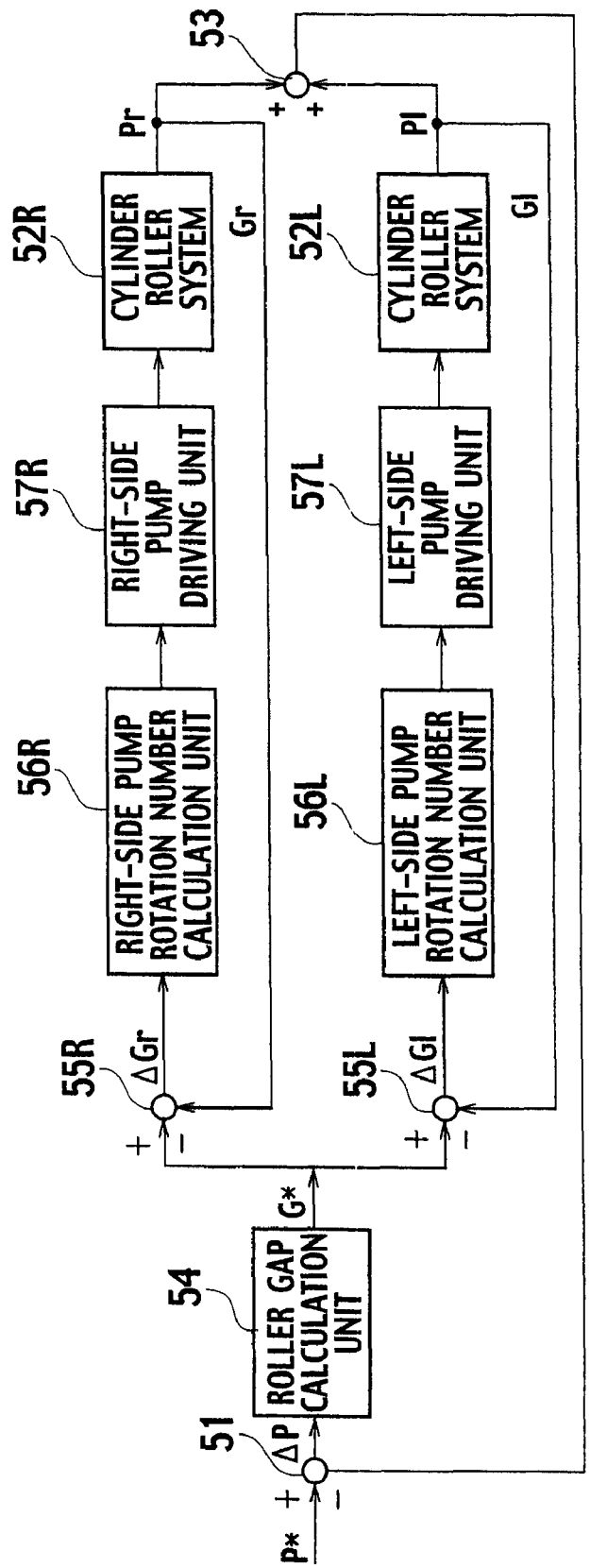
FIG. 6 is a block diagram showing a roller gap control apparatus of the sheet forming apparatus in the embodiment in detail.

With reference to FIG. 6, the cascade controlling, which is performed under the constant pressing load control mode in this embodiment, is described in detail.

A control target value P* of pressing load in the constant pressing load control mode is input into a deviation calculation unit 51.

The deviation calculation unit 51 receives a sum, an average or either one of the measured values of pressing load Pr, Pl, and determines a control deviation Δ P from the control target value P*. The measured value of pressing load Pr (Pl), which acts on a cylinder roller system 52R (52L) comprising the right-side (left-side) hydraulic cylinder device 63R (63L) and the first roller 11, is measured by the load cell 67R (67L). A calculation unit 53 determines the sum and the average of the measured values of pressing load Pr and Pl.

The control deviation Δ P is input into a roller gap calculation unit 54. There is a proportional relationship between the pressing load and the roller gap. The roller gap calculation unit 54 determines a control target value of roller gap G* from the control deviation of pressing load Δ P according to the proportional relationship where the pressing load and the roller gap are preliminarily identified.

The control target value G* increases when the control deviation of pressing load Δ P is minus and decreases when the control deviation of pressing load Δ P is plus. In this embodiment, the control target value G* is determined using PI controlling.

The control target value G* is input to deviation calculation units 55R, 55L of the cylinder roller systems 52R, 52L respectively. The deviation calculation unit 55R (55L) receives a measured value of roller gap Gr (Gl) and determines a control deviation Δ Gr (Δ Gl) from the control target value G*. The measured value of roller gap Gr (Gl) of a cylinder roller system 52R (52L) is measured by displacement gauges 65R (65L) and/or 66R (66L). The cylinder roller system 52R (52L) comprises the right-side (left-side) hydraulic cylinder device 63R (63L) and the first roller 11.

The control deviation Δ Gr (Δ Gl) is input to a right-side (left-side) pump rotation number calculation unit 56R (56L). The right-side (left-side) pump rotation number calculation unit 56R (56L) becomes zero, and then outputs a command value for the servomotor 75R (75L) to a right-side (left-side) pump driving unit 57R (57L).

The servomotor 75R (75L) is driven based on the control deviation Δ Gr (Δ Gl), and thus the 74R (74L) controls the supply of the hydraulic pressure to the cylinder chambers 72, 73 of the hydraulic cylinder devices 63R (63L), thereby controlling the right-side roller gap.

Therefore, the cascade controlling keeps the right-and-left roller gaps the same.

Under the roller gap control by the bi-directional hydraulic pumps 74R, 74L, it is also possible to drive a pump only in the direction of putting the first roller 11 against the second roller 12. If the PI calculation indicates a negative rotation, set the pump rotation number as zero and control always with the rotations in the direction of pushing.

Hydraulic servo, under no load acting, controls the roller gap by pressuring alternately in push and pull directions to maintain a roller position. Repeating the push and pull causes the roller position to vibrate. In practical sheet forming, the hydraulic cylinder devices 63R, 63L need to work only in the push direction. Setting forcibly the command value as zero even though the calculation results in the pull direction, enables to control the roller position by only push, thereby reducing the vibration.

Figure 7:
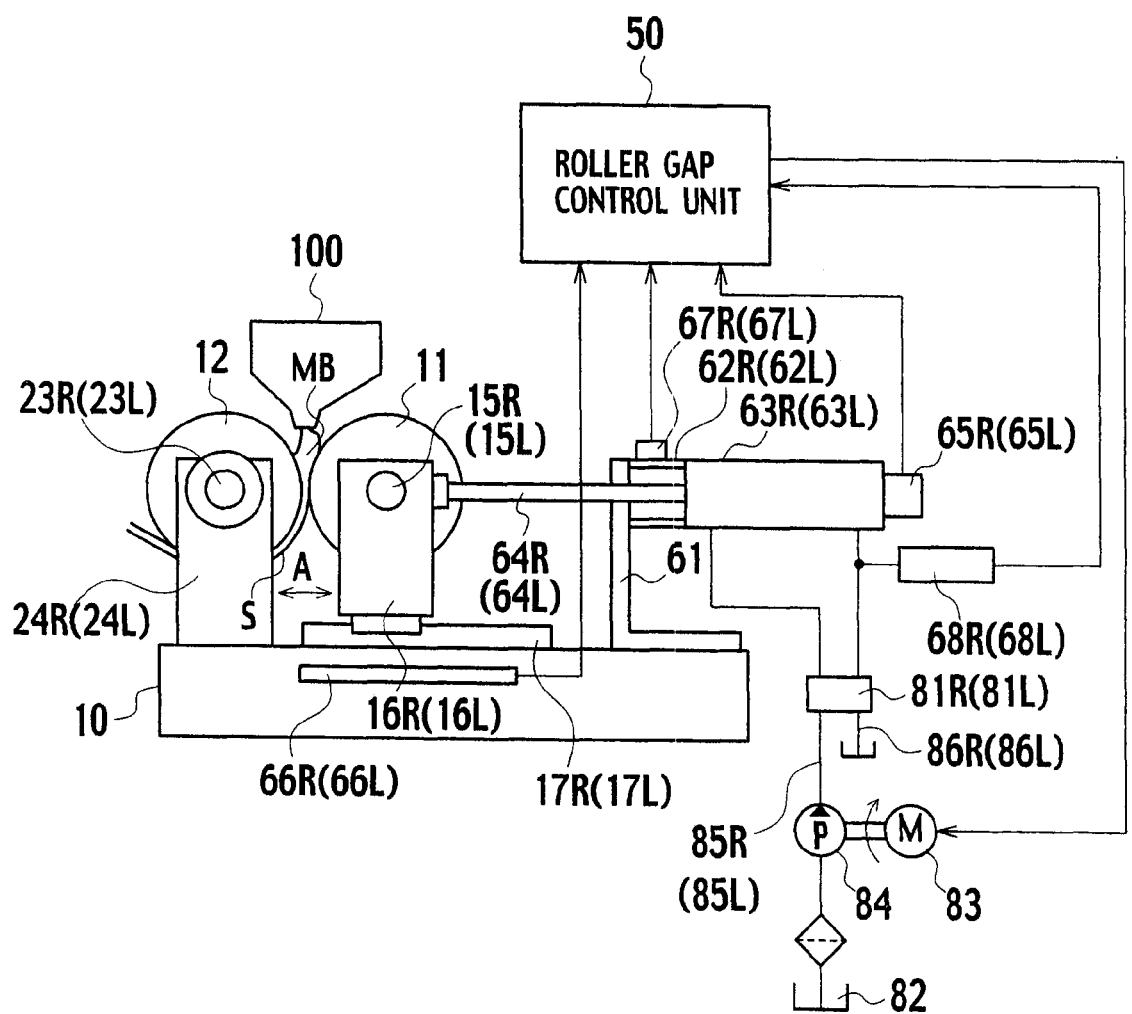
FIG. 7 is a view showing the whole structure of a sheet forming apparatus in another embodiment according to the present invention.

In the above embodiment, supplying hydraulic pressure to the cylinder chamber 72, 73 of the hydraulic cylinder devices 63R, 63L is done by means of the bi-directional hydraulic pumps 74R, 74L driven by the servomotors 75R, 75L. As shown in FIG. 7, it is also done by means of electronic servo valve 81R, 81L. The electronic servo valves 81R, 81L comprise a hydraulic tank 82, a hydraulic pump 84 driven by a servomotor 83, and filler pipes 85R, 85L and drain pipes 86R, 86L for the hydraulic pump 84. This configures a electronic-hydraulic servo system which respectively controls a supply and drain of the hydraulic pressure to the hydraulic cylinder devices 63R, 63L.

In this embodiment, the electronic servo valves 81R, 81L are made to operate only in the direction of pushing the first roller 11 against the second roller 12. If the calculation by such as PI calculation results in a command to make the valve operate in the pull direction, pushing and pulling are balanced so as to control the pressure always in the push direction, thus reducing the vibration of the roller position.

Also, the embodiment set forth above forms one example of the invention. Therefore, the present invention is not limited to a particular structure of the embodiment previously described and of course, it is to be appreciated that the invention can be embodied in other specific forms and a variety of modifications can be made in compliance with designs without departing from the technical teachings of the present invention.

The entire content of Japanese Patent Applications No. 2005-149927 filed on May 23, 2005 and No. 2005-24346 filed on Aug. 24, 2005 of which is expressly incorporated herein by reference in its entirety.

What is claimed is:

1. A sheet forming apparatus, having two rollers placed in parallel at a distance and forming a sheet by passing the sheet between the two rollers rotatively driven with both surfaces of the sheet contacting the two rollers, the sheet forming apparatus comprising:

a roller gap adjustment unit adjusting a roller gap by moving at least one of the two rollers; and a roller gap control unit with two control modes: a constant roller gap control mode where the roller gap adjustment unit adjusts the roller gap between the two rollers so that the roller gap between the two rollers converges to a predetermined control target value; and a constant pressing load control mode where the roller gap adjustment unit adjusts a value of the roller gap between the two rollers so that a pressing load acting on the roller converges to a predetermined control target value, the roller gap control unit controlling the roller gap by selectively running either one of the two modes, wherein when switching the control mode from the constant pressing load control mode to the constant roller gap control mode, the roller gap control unit sets as a control target value of roller gap one of a roller gap measured immediately before the mode switch and an average of the roller gap measured during a predetermined time, and when switching the control mode from the constant roller gap control mode to the constant pressing load control mode, the roller gap control unit sets as a control target value of pressing load one of a pressing load measured immediately before the mode switch and an average of pressing load measured during a predetermined time.

2. The sheet forming apparatus according to claim 1, further comprising:

a roller gap measurement unit measuring the roller gap between the two rollers; and a pressing load measurement unit measuring the pressing load acting on the roller.

3. The sheet forming apparatus according to claim 2, further comprising:

a temperature measurement unit measuring a temperature on the roller gap adjustment unit, and wherein the roller gap control unit corrects a measured value of the roller gap based on the temperature measured by the temperature measurement unit, and runs the constant roller gap control mode with the corrected value of the roller gap.

4. The sheet forming apparatus according to claim 2, wherein the roller gap control unit determines an amount of elastic deformation on each part of the sheet forming apparatus from the pressing load, corrects a measured value of the roller gap based on the amount of elastic deformation, and runs the constant roller gap control mode with the corrected value of the roller gap.

5. The sheet forming apparatus according to claim 2, wherein one of the two rollers is enabled to rotate with an angle relative to a plane on which the other roller is placed, and the roller gap control unit corrects a measured value of the pressing load based on the angle, and a weight of the roller and a housing supporting the roller.

6. The sheet forming apparatus according to claim 2, wherein the roller gap adjustment unit adjusts a first roller gap at one side of the roller and a second roller gap at other side of the roller, the first roller and second roller gaps being included in the roller gap, and the roller gap control unit, under the constant pressing load control mode, sets a control target value of roller gap from a deviation between a measured value of the pressing load measured by the pressing load measurement unit and a control target value of the pressing load, and controls the first roller gap and the second roller gap by the roller gap adjustment unit so that a deviation between the measured value of the roller gap measured by the roller gap measurement unit and the control target value of the roller gap becomes zero.

7. A sheet forming apparatus, having two rollers placed in parallel at a distance and forming a sheet by passing the sheet between the two rollers rotatively driven with both surfaces of the sheet contacting the two rollers, the sheet forming apparatus comprising:

a roller gap adjustment unit adjusting a roller gap by moving at least one of the two rollers; and a roller gap control unit with two control modes: a constant roller gap control mode where the roller gap adjustment unit adjusts the roller gap between the two rollers so that the roller gap between the two rollers converges to a predetermined control target value; and a constant pressing load control mode where the roller gap adjustment unit adjusts a value of the roller gap between the two rollers so that a pressing load acting on the roller converges to a predetermined control target value, the roller gap control unit controlling the roller gap by selectively running either one of the two modes, wherein when a sheet forming is started or a sheet forming condition is modified, the roller gap control unit controls the roller gap under the constant pressing load control mode, then switches the control mode from the constant pressing load control mode to the constant roller gap control mode and continues to control the roller gap.

8. A sheet forming apparatus, having two rollers placed in parallel at a distance and forming a sheet by passing the sheet between the two rollers rotatively driven with both surfaces of the sheet contacting the two rollers, the sheet forming apparatus comprising:

a roller gap adjustment unit adjusting a roller gap by moving at least one of the two rollers; and a roller gap control unit with two control modes: a constant roller gap control mode where the roller gap adjustment unit adjusts the roller gap between the two rollers so that the roller gap between the two rollers converges to a predetermined control target value; and a constant pressing load control mode where the roller gap adjustment unit adjusts a value of the roller gap between the two rollers so that a pressing load acting on the roller converges to a predetermined control target value, the roller gap control unit controlling the roller gap by selectively running either one of the two modes, wherein when a starting of a sheet forming is completed or at least one of several conditions is satisfied, the roller gap control unit switches the control mode from the constant pressing load control mode to the constant roller gap control mode, where the several conditions include a condition that a predetermined time passes since a modification of a sheet forming condition is completed; a condition that variations in width of the roller gap converge within a predetermined range; and a condition that variations in thickness of a formed sheet converge within a predetermined range.

9. A sheet forming apparatus, having two rollers placed in parallel at a distance and forming a sheet by passing the sheet between the two rollers rotatively driven with both surfaces of the sheet contacting the two rollers, the sheet forming apparatus comprising:

a roller gap adjustment unit adjusting a roller gap by moving at least one of the two rollers; and a roller gap control unit with two control modes: a constant roller gap control mode where the roller gap adjustment unit adjusts the roller gap between the two rollers so that the roller gap between the two rollers converges to a predetermined control target value; and a constant pressing load control mode where the roller gap adjustment unit adjusts a value of roller the gap between the two rollers so that a pressing load acting on the roller converges to a predetermined control target value, the roller gap control unit controlling the roller gap by selectively running either one of the two modes; wherein if the roller gap becomes less or equal to a predetermined minimum roller gap under the constant pressing load control mode, the roller gap control unit switches the control mode from the constant pressing load control mode to the constant roller gap control mode.

10. A sheet forming apparatus having two rollers placed in parallel at a distance and forming a sheet by passing the sheet between the two rollers rotatively driven with both surfaces of the sheet contacting the two rollers, the sheet forming apparatus comprising:

a roller gap adjustment unit adjusting a roller gap by moving at least one of the two rollers; and a roller gap control unit with two control modes: a constant roller gap control mode where the roller gap adjustment unit adjusts the roller gap between the two rollers so that the roller gap between the two rollers converges to a predetermined control target value; and a constant pressing load control mode where the roller gap adjustment unit adjusts a value of the roller gap between the two rollers so that a pressing load acting on the roller converges to a predetermined control target value, the roller gap control unit controlling the roller gap by selectively running either one of the two modes, wherein when switching the control mode from the constant pressing load control mode to the constant roller gap control mode, the roller gap control unit sets as a control target value of roller gap one of a roller gap measured immediately before the mode switch and an average of the roller gap measured during a predetermined time, and when switching the control mode from the constant roller gap control mode to the constant pressing load control mode, the roller gap control unit sets as a control target value of pressing load one of a pressing load measured immediately before the mode switch and an average of pressing load measured during a predetermined time, a roller gap measurement unit measuring the roller gap between the two rollers; and a pressing load measurement unit measuring the pressing load acting on the roller, wherein the roller gap measurement unit measures a first roller gap "G1" at one side of the roller and a second roller gap "G2" at another side of the roller, the first roller and second roller gaps being included in the roller gap, and if a difference "G1−G2" between the first roller gap "G1" and the second roller gap "G2" becomes greater or equal to a predetermined value under the constant pressing load control mode, the roller gap control unit decreases a control target value "P1" of pressing load on one side of the roller with a narrower roller gap and increases a control target value "P2" of pressing load on the other side of the roller with a wider roller gap under based on a condition that $P1=P/2+f(G1-G2)$ and $P2=P/2-f(G1-G2)$ where the "P" is a predetermined constant value and the "f" is a predetermined correction function.

11. A roller gap control method in a sheet forming apparatus, having two rollers placed in parallel at a distance and forming a sheet by passing the sheet between the two rollers rotatively driven with both surfaces of the sheet contacting the two rollers, the roller gap control method comprising:
moving at least one of the two rollers;
measuring a roller gap between the two rollers;
measuring a pressing load acting on the roller;
running selectively either one control mode of two modes: a constant roller gap control mode where the roller gap between the two rollers are adjusted so that the roller gap between the two rollers converges to a predetermined control target value; and a constant pressing load control mode where the roller gap between the two rollers is adjusted so that the pressing load acting on the roller converges to a predetermined control target value;
setting as a control target value of roller gap one of a roller gap measured immediately before a mode switch and an average of the roller gap measured during a predetermined time, when switching the control mode from the constant pressing load control mode to the constant roller gap control mode; and
setting as a control target value of pressing load one of a pressing load measured immediately before a mode switch and an average of the pressing load measured during a predetermined time, when switching the control mode from the constant roller gap control mode to the constant pressing load control mode.

12. The roller gap control method according to claim 11, further comprising:
measuring a first roller gap at one side of the roller and a second roller gap at other side of the roller, the first roller and second roller gaps being included in the roller gap, and
decreasing a control target value of pressing load on one side of the roller with a narrower roller gap and increases a control target value of pressing load on the other side of the roller with a wider roller gap, if a difference between the first roller gap and the second roller gap becomes greater or equal to a predetermined value under the constant pressing load control mode.

13. The roller gap control method according to claim 11, further comprising:
setting a control target value of the roller gap from a deviation between a measured value of the pressing load and a control target value of the pressing load under the constant pressing load control mode; and
controlling the roller gap so that a deviation between a measured value of the roller gap and the control target value of the roller gap becomes zero.

14. The roller gap control method according to claim 11, wherein the moving step includes adjusting a roller position under a positional control until the roller gap comes to a roller gap wider by a predetermined width than a thickness of a sheet to be formed or a predetermined roller gap.

15. A roller gap control method in a sheet forming apparatus, having two rollers placed in parallel at a distance and forming a sheet by passing the sheet between the two rollers rotatively driven with both surfaces of the sheet contacting the two rollers, the roller gap control method comprising:
moving at least one of the two rollers;
measuring a roller gap between the two rollers;
measuring a pressing load acting on the roller;
running selectively either one control mode of two modes: a constant roller gap control mode where the roller gap between the two rollers are adjusted so that the roller gap between the two rollers converges to a predetermined control target value; and a constant pressing load control mode where the roller gap between the two rollers is adjusted so that the pressing load acting on the roller converges to a predetermined control target value;
controlling the roller gap under the constant pressing load control mode when a sheet forming process is started or a sheet forming condition is modified; and
switching the control mode to the constant roller gap control mode and continuing to control the roller gap.

16. A roller gap control method in a sheet forming apparatus, having two rollers placed in parallel at a distance and forming a sheet by passing the sheet between the two rollers rotatively driven with both surfaces of the sheet contacting the two rollers, the roller gap control method comprising:
moving at least one of the two rollers;
measuring a roller gap between the two rollers;
measuring a pressing load acting on the roller;
running selectively either one control mode of two modes: a constant roller gap control mode where the roller gap between the two rollers are adjusted so that the roller gap between the two rollers converges to a predetermined control target value; and a constant pressing load control mode where the roller gap between the two rollers is adjusted so that the pressing load acting on the roller converges to a predetermined control target value;
switching the control mode from the constant pressing load control mode to the constant roller gap control mode when a starting of the sheet forming is completed or at least one of several conditions is satisfied: a predetermined time passes since a modification of a sheet forming condition is completed, variations in width of the roller gap converge within a predetermined range, and variations in thickness of a formed sheet converge within a predetermined range.

17. A roller gap control method in a sheet forming apparatus, having two rollers placed in parallel at a distance and forming a sheet by passing the sheet between the two rollers rotatively driven with both surfaces of the sheet contacting the two rollers, the roller gap control method comprising:
moving at least one of the two rollers;
measuring a roller gap between the two rollers;
measuring a pressing load acting on the roller;
running selectively either one control mode of two modes: a constant roller gap control mode where the roller gap between the two rollers are adjusted so that the roller gap between the two rollers converges to a predetermined control target value; and a constant pressing load control mode where the roller gap between the two rollers is adjusted so that the pressing load acting on the roller converges to a predetermined control target value;
switching the control mode from the constant roller gap control mode to the constant pressing load mode, changing a control target value of the pressing load under the constant pressing load control mode based on a measured value of the pressing load in the mode switch, switching the control mode to the constant roller gap control mode with a currently measured value of the roller gap as a control target value of the roller gap, when at least one of several conditions is satisfied: a predetermined time passes since the control target value of the pressing load is changed, variations in width of the roller gap converge within a predetermined range, and variations in thickness of a formed sheet converge within a predetermined range.

* * * * *